(12) United States Patent
Hamad et al.

(10) Patent No.: US 9,384,867 B2
(45) Date of Patent: Jul. 5, 2016

(54) FLEXIBLE, SEMICONDUCTING NANOCOMPOSITE MATERIALS BASED ON NANOCRYSTALLINE CELLULOSE AND POLYANILINE

(75) Inventors: Wadood Yasser Hamad, Vancouver (CA); Siham Atifi, Vancouver (CA)

(73) Assignee: FPINNOVATIONS, Pointe-Claire, Quebec (CA)

( * ) Notice: Subject to any disclaimer, the term of this patent is extended or adjusted under 35 U.S.C. 154(b) by 284 days.

(21) Appl. No.: 14/007,060

(22) PCT Filed: Mar. 28, 2012

(86) PCT No.: PCT/CA2012/000281
§ 371 (c)(1),
(2), (4) Date: Nov. 28, 2013

(87) PCT Pub. No.: WO2012/129659
PCT Pub. Date: Oct. 4, 2012

(65) Prior Publication Data
US 2014/0203214 A1    Jul. 24, 2014

Related U.S. Application Data

(60) Provisional application No. 61/468,745, filed on Mar. 29, 2011.

(51) Int. Cl.
*H01B 1/20* (2006.01)
*C08L 79/02* (2006.01)
*C08L 1/04* (2006.01)
*B82Y 30/00* (2011.01)

(52) U.S. Cl.
CPC . *H01B 1/20* (2013.01); *B82Y 30/00* (2013.01); *C08L 1/04* (2013.01); *C08L 79/02* (2013.01)

(58) Field of Classification Search
CPC ............. H01B 1/20; C08L 79/02; C08L 1/02; C08J 5/24
USPC ...................... 252/500; 428/402.24, 403, 402; 427/121
See application file for complete search history.

(56) References Cited

U.S. PATENT DOCUMENTS

| | | | |
|---|---|---|---|
| 5,232,631 A | 8/1993 | Cao | |
| 5,567,356 A | 10/1996 | Kinlen | |
| 2003/0179432 A1* | 9/2003 | Vincent | G02F 1/155 359/265 |
| 2005/0079386 A1* | 4/2005 | Brown | B82Y 10/00 428/690 |
| 2006/0144543 A1* | 7/2006 | Aho | D21C 9/005 162/164.6 |
| 2007/0125489 A1* | 6/2007 | Paul | B29C 65/1425 156/272.8 |
| 2008/0297878 A1* | 12/2008 | Brown | B82Y 10/00 359/263 |
| 2013/0122533 A1* | 5/2013 | Pitchai-Mydeen | C08J 5/18 435/28 |

FOREIGN PATENT DOCUMENTS

| | | |
|---|---|---|
| JP | 2006522233 | 9/2006 |
| WO | 2004088035 | 10/2004 |

OTHER PUBLICATIONS

Dawei Zhang et al., "Nanocomposites of Polyaniline and Cellulose Nanocrystals Prepared in Lyotropic Chiral Nematic Liquid Crystals", Journal of Materials, 2013, ID 614507, pp. 1-6.*
Provisional U.S. Appl. No. 61/333,953, filed May 12, 2010.*
Skotheim, T. G., Elsenbaumer, R. L., Reynolds, J. R., "Handbook of Conducting Polymers," Marcel Dekker, New York, 2nd Ed. (1998).
Chandrasekhar, P., "Conducting Polymers, Fundamentals and Applications: A practical Approach," Kluer Academic, Boston (1999).
Wan, M., Li, M., Li, J., Liu, Z., "Transparent and conducting coatings of polyaniline composites," Thin Solid Films 259: 188-193 (1995).
Rao, P.S., Subrahmanya, S., Sathyanarayana, D. N., "Polyaniline-polycarbonate blends synthesized by two emulsion pathways," Synthetic metals 143: 323-330 (2004).
Lin, J. Tang, Q. Wu, J. Sun, H. "Synthesis, characterization and properties of polyaniline / expanded vermiculite intercalated nanocomposite," Sci. Technol. Adv. Mater. 9: 025010 (2008).
Mo, Z. L., Zhao, Z. L., Chen, H., Niu, G. P., Shi, H. F., "Heterogeneous preparation of cellulose-polyaniline conductive composites with cellulose activated by acids and its electrical properties," Carbohydrate Polymers 75: 660-664 (2009).
Lukasiewicz, M., Ptaszek, A., Koziel, L., Achremowicz, B., Grzesik, M., "Carboxymethylcellulose/polyaniline blends. Synthesis and properties," Polymer Bulletin 58: 281-288 (2007).

(Continued)

*Primary Examiner* — Douglas McGinty
(74) *Attorney, Agent, or Firm* — Norton Rose Fulbright Canada LLP

(57) ABSTRACT

A new approach is conceived for the development of organic polymeric conducting materials synthesized from nanocomposites of nanocrystalline cellulose (NCC) and polyaniline (PANI). The process involves oxidative-radical polymerization of aniline in the presence of NCC using either in situ or emulsion polymerization. The resulting NCC-PANI nanocomposite material can be obtained in film or powder form and exhibits electrical conductive properties typical of semiconducting materials. Unlike PANI, a brittle conductive polymer, NCC-PANI nanocomposite materials can be engineered to possess significant flexibility, strength and/or hardness as a result of the NCC acting as a reinforcing scaffold. Depending on the preparation conditions, electrical conductivities for the NCC-PANI nanocomposite materials prepared according to this disclosure range from $9.98 \times 10^{-5}$ to $1.88 \times 10^{-2}$ S·cm$^{-1}$; they could also have hardness $\geq 0.189$ GPa or be formed into flexible films of tensile strength of the order of 9.74 MPa and stretch of the order of 0.54%. These unique electrical and mechanical properties render these materials suitable for use in a variety of value-added industrial products, such as batteries, electronics, electrical sensors, separation membranes, anti-static coatings for aerospace applications, as well as anti-corrosive coatings for automotives and other industrial applications.

16 Claims, 5 Drawing Sheets

(56) References Cited

OTHER PUBLICATIONS

Mattoso, L. H. C., Medeiros, E. S., Baker, D. A., Avloni, J., Wood, D. F., Orts, W., "Electrically conductive nanocomposites made from cellulose nanofibrils and polyaniline," Journal of Nanoscience and nanotechnology 9: 2917-2922 (2009).

Berg, V. D. O, Schroeter, M., Capadona, J. R., Weder C., "Nanocomposites based on cellulose whiskers and (semi) conducting conjugated polymers," Journal of. Material Chemistry 17: 2746-2753 (2007).

Chiang, J.C., Macdiarmid, A.G., "Polyaniline: Protonic acid doping of the emeraldine form to the metallic regime" Synth. Met. 13: 193-205 (1986).

Österholm, J. E., Cao, Y., Klavetter, F., Smith, P., "Emulsion polymerization of aniline," Polymer 35: 2902-2906 (1994).

Stafström, S., Brédas, J. L., Epstein, A. Aj., Woo, H. S., Tanner, D. B., Huang, W. S., MacDiarmid, A. G., "Polaron Lattice in Highly Conducting Polyaniline: Theoretical and Optical Studies," Phys. Rev. Lett. 59: 1464-1467 (1987).

Kane-Maguire, L. A. P., MacDiarmid, A. G., Norris, I. D., Wallace, G. G., Zheng, W. "Facile preparation of optically active polyaniline via the in situ chemical oxidative polymerization of aniline," Synth. Met., 106: 171-176 (1999).

Epstein, A. J., Ginder, J. M., Zuo, F., Bigelow, R. W., Woo, H. S., Tanner, D. B., Richter, A. F., Huang, W. S., MacDiarmid, A. G., "Insulator-to-metal transition in polyaniline," Synth. Met. 18: 303-309 (1987).

Kakani, S. L., "Semiconductors and junction diodes," Electronics Theory and Applications, pp. 23-24 (2005).

Metals Handbook, vol. 2, 10th ed., Properties and Selection: Nonferrous Alloys and Special-Purpose Materials, pp. 704-707, ISBN 0-87170-378-5 (1990).

Wang, D. W, Li, F., Zhao, J., Ren, W., Chen, Z. G., Tan, J., Wu, Z. S., Gentle, I., Lu, G. Q., Cheng, H. M., "Fabrication of graphene/polyaniline composite paper via in situ anodic electropolymerization for high-performance flexible electrode," ACS Nano 3: 1745-1752 (2009).

Paakko, M. et al."Long and entangled native cellulose I nanofibers allow flexible y aerogels and hierarchically porous templates for functionalities." Soft Matter, vol. 4, Online Sep. 23, 2008, p. 2492-2499. (whole document).

Hu, Weili et al. "Flexible electrically conductive nanocomposite membrane based on bacterial cellulose and polyaniline."J. Phys. Chem., vol. 115, p. 8453-8457, Jun. 14, 2011.X,P (whole document).

Marins, J.A. et al. "Structure and properties of conducting bacterial cellulose-polyaniline nanocomposites." Cellulose, vol. 18, Online Jun. 15, 2011, p. 1285-1294.(whole document).

Auad, Maria L et. al., Polyaniline-modified cellulose nanofibrils as reinforcement of a smart polyurethane, Polymer International, Dec. 24, 2010, vol. 60, Issue 5, pp. 743-750.

English language Abstract of JP 2006522233 (WO 2004/088035).

\* cited by examiner

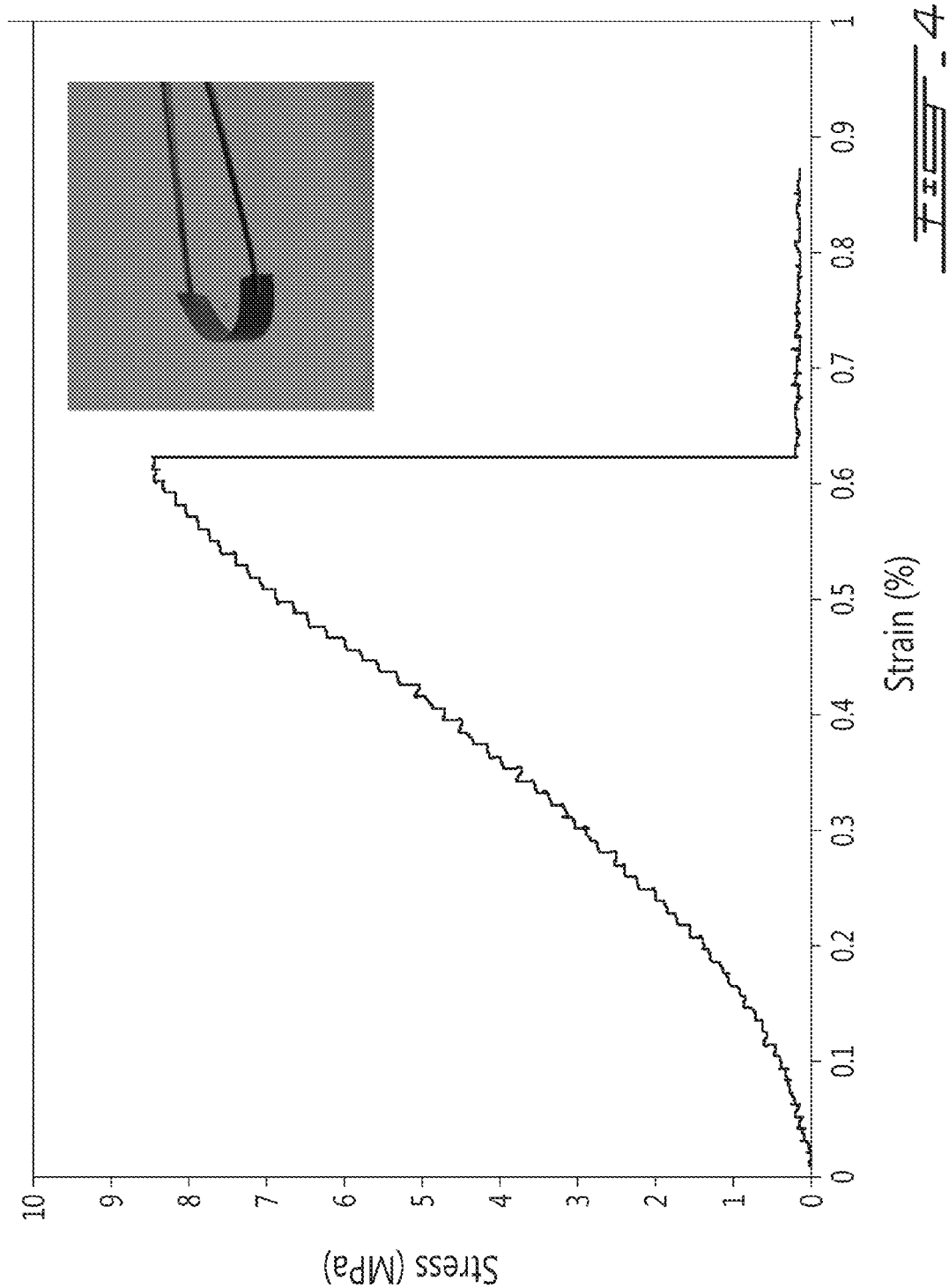

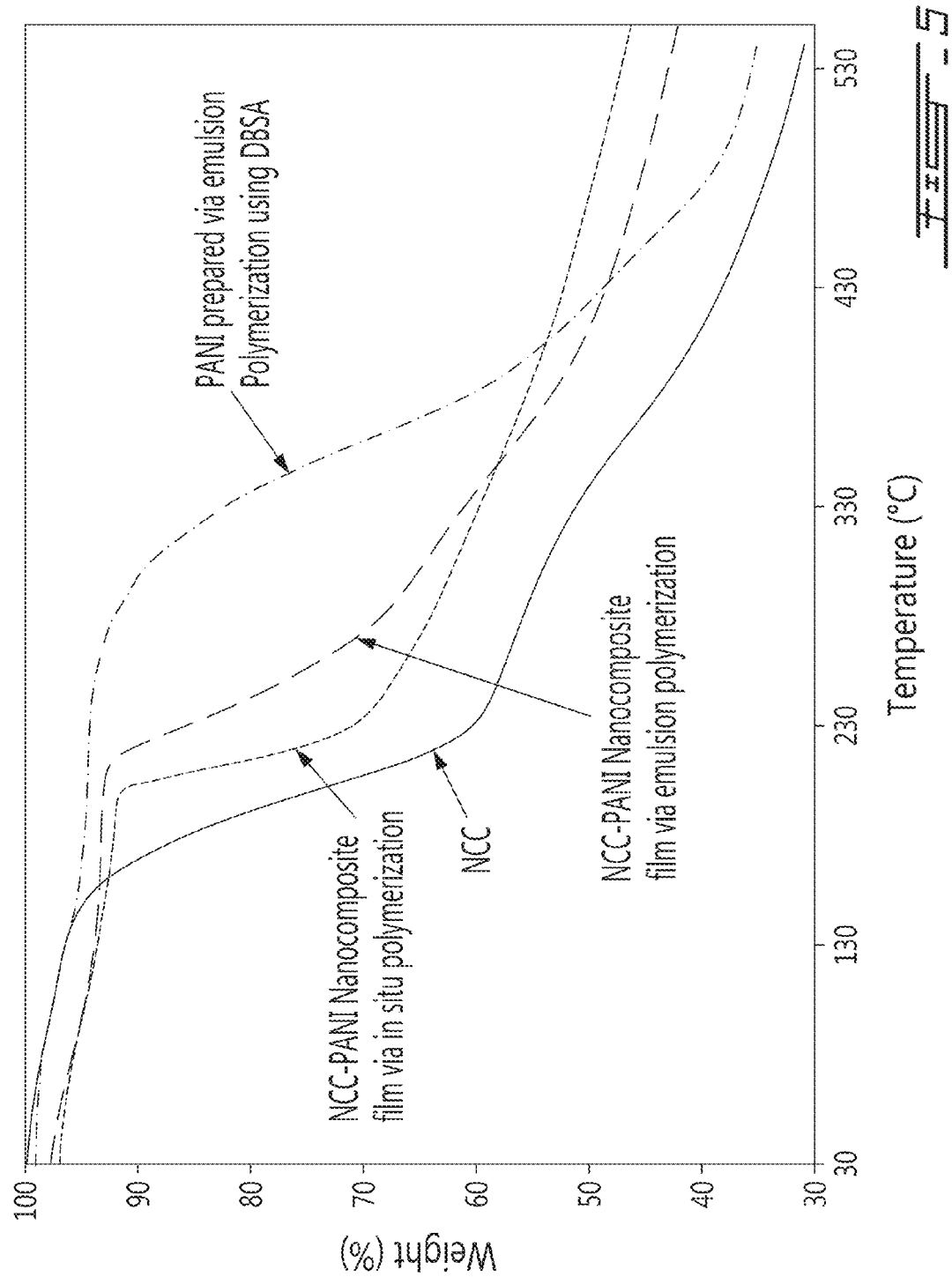

FLEXIBLE, SEMICONDUCTING NANOCOMPOSITE MATERIALS BASED ON NANOCRYSTALLINE CELLULOSE AND POLYANILINE

CROSS-REFERENCE TO RELATED APPLICATIONS

This application is a National entry of PCT/CA 2012/000281 filed Mar. 28, 2012, in which the U.S.of America was designated and elected, and which remains pending in the International phase until Sep. 29, 2013, which application in turn claims priority under 35 USC 119(e) from U.S. provisional application Ser. No. 61/468,745, filed Mar. 29, 2011.

TECHNICAL FIELD

Background Art

This invention relates to a nanocomposite material comprising polyaniline (PANI) and nanocrystalline cellulose (NCC), and processes for producing the nanocomposite material. The resulting NCC-PANI nanocomposite material can be obtained in film or powder form and is suitable for a range of value-added applications in semiconducting devices, anti-corrosive and anti-static coatings for, for example, aerospace, automotive and other applications. These unique electrical and mechanical properties render these materials suitable for use in a variety of value-added industrial products, such as batteries, electronics, electrical sensors, separation membranes, anti-static coatings for aerospace applications, as well as anti-corrosive coatings for automotives and other industrial applications.

During the past two decades, conductive, or conjugated, polymers have been under intensive research and development in academia and the chemicals and electronics industry worldwide. Their use as new materials in value-added industrial and consumer products could be opening up entirely new dimensions for polymeric materials.

Among the family of conjugated polymers, polyaniline (PANI) is one of the most promising conducting polymers due to its straightforward polymerization both chemically and electrochemically and excellent chemical stability combined with relatively high levels of conductivity. It has very simple acid/base doping/de-doping chemistry and a great variety of potential applications including anticorrosion coatings, batteries, sensors, separation membranes, and antistatic coatings [1, 2]. Polyaniline possesses three readily accessible oxidation states. These range from the fully reduced leucomeraldine state to the half oxidized emeraldine form to the fully oxidized pernigraniline state. Emeraldine is the state with the highest conductivity.

Despite its high conductivity and unique electronic properties, polyaniline has inferior mechanical properties compared to conventional polymers. These limitations can be overcome by preparing conducting polyaniline blends and composites which possess the mechanical properties of the insulating host matrix and the electrical properties of the conducting polyaniline guest—for example, PANI-poly(methylmethacrylate) [3], PANI-polycarbonate [4], PANI-nanoclay [5] blends and composites.

A number of polysaccharides have also been used to engender better mechanical performance in PANI-based materials. In a recent report, cellulose-polyaniline composites were heterogeneously synthesized by chemical oxidative polymerization of aniline with natural cellulose activated for a period of time by various acids before polymerization. These acids were used as activation reagents to break the intermolecular hydrogen bonds and improve the accessibility and reactivity of cellulose [6]. It has also been reported that a composite has been prepared by blending polyaniline with semi-synthetic carboxymethylcellulose (CMC), following slow evaporation of the solvent from a mixture of polyaniline in tetrahydrofuran and a water solution of CMC [7]. Furthermore, nanocomposites from cellulose nanocrystals and polyaniline have been attempted by in situ polymerization of aniline onto cellulose nanocrystals. According to this method, the oxidative polymerization of aniline in the presence of cellulose nanocrystals was performed by ammonium peroxydisulfate (APS) in hydrochloric acid at very low concentrations of aniline, APS and cellulose nanocrystals leading to an aqueous suspension of cellulose nanocrystals coated with polyaniline [8]. This material was not reported to have differentiating mechanical properties, most likely because of the failure to produce a sufficiently robust cellulose scaffold. In another report, a mixture of polyaniline and camphorsulfonic acid in formic acid was added to a dispersion of sulphate-functionalized tunicate whiskers in formic acid. The blended mixture was then cast by evaporation at room temperature, and the resulting films were reported to be mechanically stable [9].

SUMMARY OF THE INVENTION

This invention seeks to provide a nanocomposite comprising polyaniline (PANI) and nanocrystalline cellulose (NCC).

This invention also seeks to provide a process for producing a nanocomposite comprising polyaniline (PANI) and nanocrystalline cellulose (NCC).

In one aspect of the invention there is provided a nanocomposite of polyaniline and nanocrystalline cellulose (NCC).

In another aspect of the invention there is provided a process for producing a nanocomposite of polyaniline and nanocrystalline cellulose (NCC) comprising polymerizing aniline in the presence of nanocrystalline cellulose (NCC).

DESCRIPTION OF THE DRAWINGS

FIG. 4: is stress versus strain plot for NCC-PANI nanocomposite film prepared by emulsion polymerization (sample D), where the inset is a photo depicting flexibility of said film; and FIG. 5: is thermogravimetric analysis (TGA) results of NCC-PANI nanocomposite films prepared via in situ and emulsion polymerizations, in relation to NCC and PANI, indicating the robust thermal stability of the resulting films.

DESCRIPTION OF THE TABLES

Figure 1:
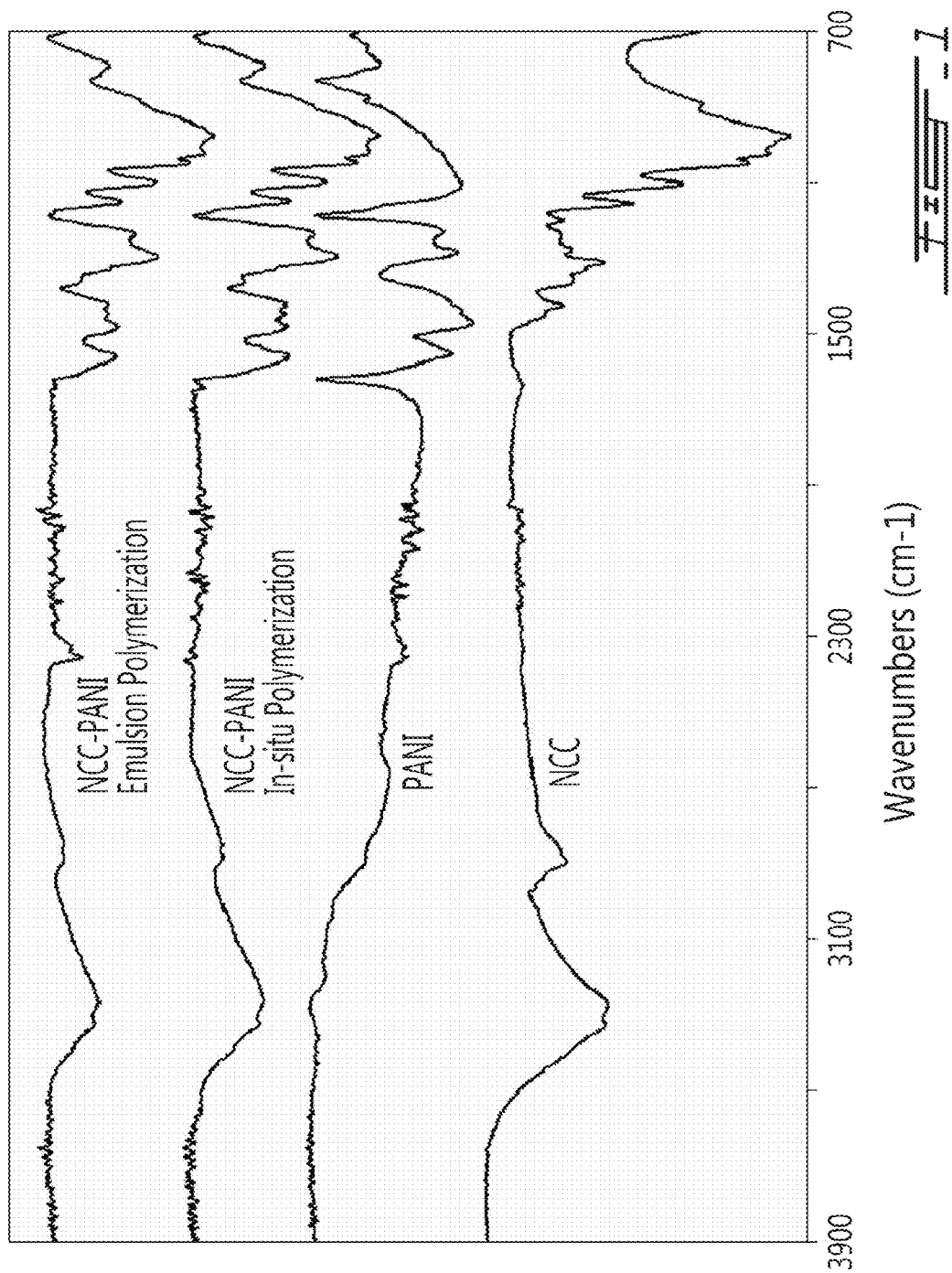
FIG. 1: is Fourier-transform infrared (FT-IR) spectra of NCC, polyaniline (emeraldine salt) and NCC-PANI nanocomposite material prepared by in situ and emulsion polymerizations.

TABLE 1: Electrical conductivity of NCC-PANT nanocomposite materials prepared by in situ and emulsion polymerization compared to NCC, polyaniline and other materials.

TABLE 2: Hardness data of NCC-PANI nanocomposite materials prepared by in situ and emulsion polymerization in relation to some other materials.

TABLE 3: Mechanical strength properties of NCC-PANI nanocomposite materials compared to other materials.

DETAILED DESCRIPTION OF THE INVENTION

This invention relates to a nanocomposite material comprising polyaniline (PANI) and nanocrystalline cellulose (NCC) and to a process of preparing the nanocomposite material, whereby the resulting nanocomposite material possesses electrical conductivity typical of semiconducting materials and excellent strength, flexibility and/or hardness. The process specifically involves an approach based on oxidative-radical polymerization of aniline in the presence of nanocrystalline cellulose (NCC) using either in situ or emulsion polymerization. Both methods involve the addition of an oxidizer to a mixture of NCC, aniline, and a protonic acid or water with an acid/surfactant in the case of emulsion polymerization. The resulting NCC-PANI nanocomposite material can be obtained in film or powder form and is suitable for a range of value-added applications in semiconducting devices, anti-corrosive and anti-static coatings for, for example, aerospace, automotive and other applications.

NCC obtained via hydrolytic extraction of lignocellulosic materials (e.g. wood pulp, cotton, bacteria, etc.) is made of cellulose, a linear polymer of $\beta(1\rightarrow4)$ linked D-glucose units, the chains of which arrange themselves to form crystalline and amorphous domains. NCC has a degree of polymerization (DP) in the range $90 \leq DP \leq 110$, and 3.7-6.7 sulphate groups per 100 anhydroglucose units, and comprises crystallites whose physical dimension ranges between 5-14 nm in cross-section and 20-100 nm in length, depending on the raw material used in the extraction. These charged crystallites can be suspended in water, or other solvents if appropriately derivatized, or self assemble to form solid materials via air, spray- or freeze-drying. When dried, NCC forms an agglomeration of parallelopiped rod-like structures, which possess cross-sections in the nanometer range (5-20 nm), while their lengths are orders of magnitude larger (100-1000 nm) resulting in high aspect ratios. The iridescence of NCC self-assemblies is typically characterized by the finger-print patterns, where the patch work of bright and dark regions is typical of spherulitic behaviour of fibrillar crystals in which the molecules are packed with their axes perpendicular to the fibrillar axis. NCC is also characterized by high crystallinity (>80%, and most likely between 85 and 97%) approaching the theoretical limit of the cellulose chains.

Colloidal suspensions of cellulose crystallites form chiral nematic structure upon reaching a critical concentration. The cholesteric structure consists of stacked planes of molecules aligned along a director (n), with the orientation of each director rotated about the perpendicular axis from one plane to the next. This structure forms spontaneously in solutions of rigid, rod-like molecules. Hydrogen bonding between cellulose chains can stabilize the local structure in NCC, and plays a key role in the formation of crystalline domains. Crystallinity, defined as the crystalline fraction of the sample, strongly influences the physical and chemical behaviour of NCC. For example, the crystallinity of NCC directly influences the accessibility for chemical derivatization, swelling and water-binding properties.

Figures 3A, 3B:
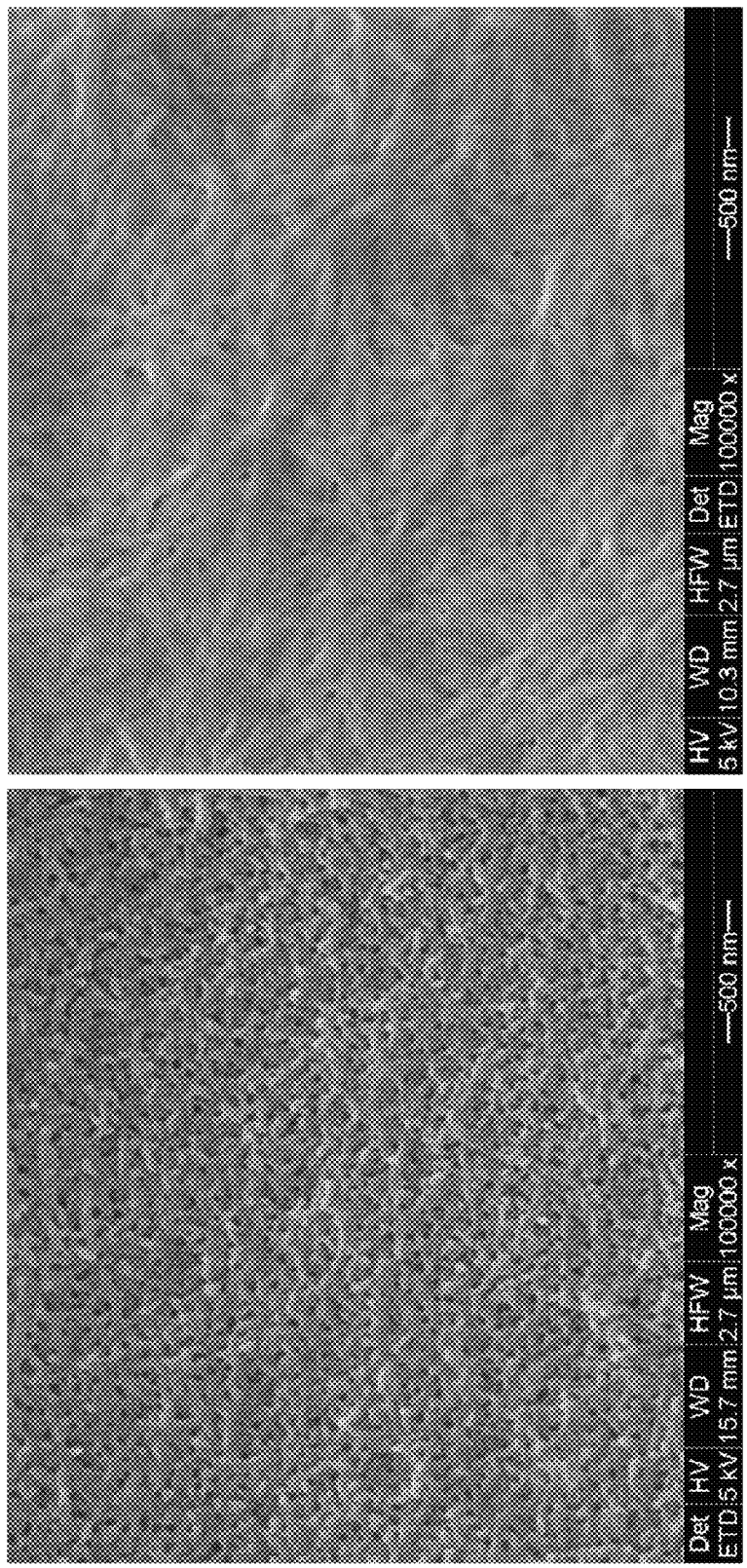
FIGS. 3a) and 3b): are SEM images of the surface of NCC-PANI nanocomposite films prepared by (a) in situ polymerization (sample A) and (b) emulsion polymerization (sample D). The homogeneous NCC scaffold is clearly indicated in both images.

The nanocrystalline cellulose (NCC) forms a scaffold within the composite, such scaffold provides the reinforcement and flexibility in the composite. The polyaniline occupies the voids of the scaffold and provides the electrical conductivity. The nanocrystalline cellulose (NCC) naturally forms an ordered arrangement of nanoparticles and in particular a helical assembly of its chiral nematic liquid crystal phase. In the polymerization process the aniline polymerizes to polyaniline in the voids of the scaffold formed by the ordered assembly of the NCC. The polymerized aniline may be in different physical forms, for example it may be granular polyaniline or it may be fibrillar polyaniline or mixtures of granular and fibrillar. Examining the SEMs of FIGS. 3a) and 3b), reveals a perfectly-ordered, self-assembled NCC scaffold with the voids of the scaffold filled with PANI.

Thus, a new approach is conceived for the development of organic electrically conductive and mechanical robust polymeric materials synthesized from nanocomposites of nanocrystalline cellulose (NCC) and polyaniline (PANI). The process involves oxidative-radical polymerization of aniline in the presence of NCC in aqueous medium aided by a suitable initiator-oxidant. The reaction can be carried out using either in situ or emulsion polymerization.

The polymerization reaction involves combining NCC suspension, aniline, a protonic acid, and an oxidizing agent and allowing the mixture to react while maintaining the reaction mixture at a constant low temperature (normally about 5° C. to room temperature) for a period of several hours (2 to 24 hours). The resulting NCC-PANI nanocomposite material can be obtained in film or powder form, and exhibits electrical conductive properties typical of semiconducting materials like germanium and silicon. Unlike PANI, a brittle conductive polymer, NCC-PANI nanocomposite materials can be engineered to possess significant flexibility, strength and/or hardness as a result of the NCC acting as a reinforcing scaffold. Depending on the preparation conditions, electrical conductivities for the NCC-PANI nanocomposite materials prepared according to this disclosure range from $9.98 \times 10^{-5}$ to $1.88 \times 10^{-2}$ S·cm$^{-1}$. They could also have hardness $\geq 0.189$ GPa, or be formed into flexible films of tensile strength of the order of 9.74 MPa and stretch of the order of 0.54%, which is stronger than polyethylene or graphene paper. These unique electrical and mechanical properties render these materials suitable for use in a variety of value-added industrial products, such as batteries, electronics, electrical sensors, separation membranes, anti-static coatings for aerospace applications, as well as anti-corrosive coatings for automotives and other industrial applications.

The synthesis of NCC-PANI nanocomposite materials using in situ polymerization is typically conducted by mixing an aqueous solution of aniline in hydrochloric acid with a known amount of NCC suspension and slowly adding an aqueous solution of ammonium peroxydisulfate [(NH$_4$)$_2$S$_2$O$_8$] to the mixture at low temperature (0-5° C.) because oxidation of aniline is an exothermic reaction and polyaniline formed at low temperature is more ordered and therefore more conductive [10]. Ammonium peroxydisulfate (APS) is preferably employed as chemical oxidant for aniline polymerization. The reaction time can range from 2 hours to 24 hours, and the temperature between 0° C. and room temperature (~21° C.). During the reaction, the blue colour characteristic of protonated pernigraniline appears after 1 hour of reaction. The green emeraldine salt is observed after 2 hours. The molar ratio of monomer to oxidant is optimally 1:1 and the mass ratio of NCC to aniline is preferred to be 2:1. However, the molar ratio of oxidant to aniline can range from 0.1 to 10, and preferably 0.2 to 5. The concentration of aniline and oxidant in the solution is fixed at 0.05 M. The suspension is centrifuged in order to remove by-products, and the remaining thick suspension is washed twice with its own acid solution diluted five times—in this case a diluted solution of HCl (0.2M)—and then dialyzed against deionized water for 2 days. The purified PANI-NCC suspension is dispersed by applying sonication. Washing can also be accomplished with acetone or methanol instead of dialysis.

The process can also be achieved using other acids such as sulphuric or formic acid. The acid can be replaced with water but a large amount of bifunctional protonic acid (dopant) will need to be added to the mixture, such as (1S)-(+)-10-camphoresulfonic acid (HCSA) or dodecylbenzenesulfonic acid (DBSA). Alternatively, aniline hydrochloride could be used as the monomer in the reaction instead of aniline.

The second method employed in this invention to prepare NCC-PANI nanocomposite material is emulsion polymerization. This process has previously been reported for preparing polyaniline salts [11-13]. Aniline, a protonic acid, and an oxidant are combined with a mixture of water, and a non-polar or weakly polar liquid, for example, xylene, chloroform, or toluene. To form an emulsion in such a system, protonic acids that have substantial emulsifying properties in weakly polar liquids, for example, dodecylbenzene sulfonic acid (DBSA) are employed. NCC is not compatible with these solvents, and would lead to the formation of a two-phase system where PANI remains as a soluble component in the organic solvent whilst the NCC, along with the reaction by-products, remains in the aqueous phase.

According to the present invention, emulsion polymerization of aniline in the presence of NCC is carried out in water without organic solvents, whereby the long-alkyl-chained DBSA acts as dopant and surfactant. The NCC-Anilinium-DBSA complex is prepared by mixing the NCC suspension with a stoichiometric ratio of aniline and DBSA in water for a period of 3 hours at room temperature. The dispersion is cooled to 0-5° C. and a solution of ammonium peroxydisulfate (APS) added dropwise. The polymerization process is carried out at ice temperature for 24 hours, and a colour change from white—characteristic of anilinium-DBSA complex in water—through blue after an induction time of 45 minutes, to finally dark green—characteristic of the doped form of emeraldine salt—is observed. In general, the molar ratio of APS to aniline is 1:1, the molar ratio of surfactant to aniline is preferred to be 0.5:1 or 1:1, the concentration of APS and aniline in the solution is suitably 0.05 M, and the mass ratio of NCC to aniline is suitably fixed at 2:1. Moreover, this method can be performed using ionic or non-ionic surfactants. In the case of non-ionic surfactants, aniline hydrochloride is used as monomer instead of aniline, and no external acid is added during the polymerization. Addition of HCl (1M) can hinder the efficiency of the non-ionic surfactant in stabilizing the heterogeneous reactive medium.

While a mass ratio of NCC:polyaniline of 2:1 appears to be optimum in producing the reinforcing scaffold with desirable mechanical properties and maintaining good electrical conductivity or semiconductivity, other ratios are possible for example 1:1 to 18:1, and 2:1 to 11:1, as well as 1.5:1 to 11:1, 1.5:1 to 6:1, and 1.5:1 to 5:1.

Figure 2:
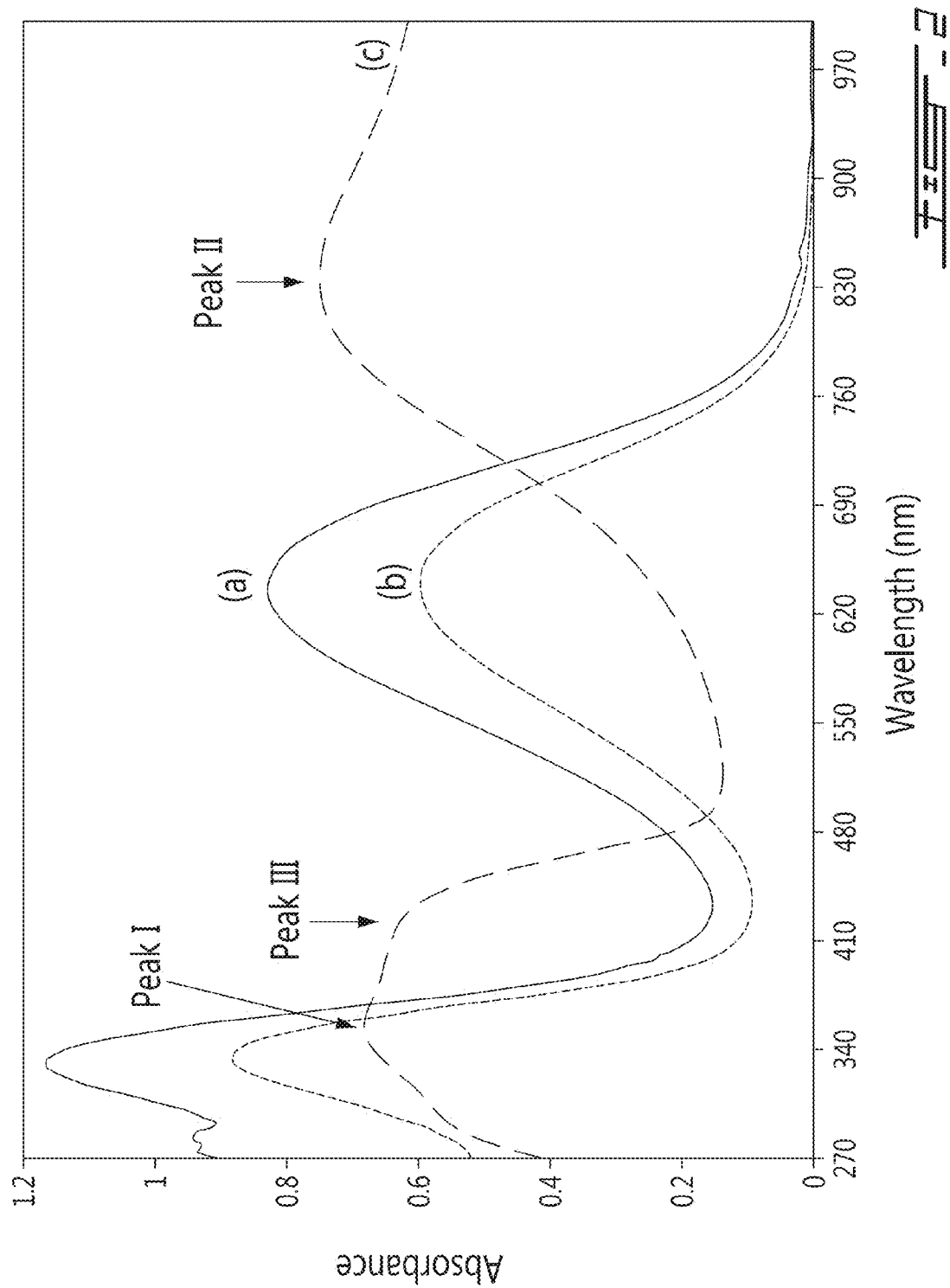
FIG. 2: is UV-vis spectra of (a) undoped PANI, (b) undoped NCC-PANI nanocomposite suspension, and (c) NCC-PANI nanocomposite suspension doped with 1M HCl, illustrating the electronic absorption bands of the polymer moieties. Three bands are observed for the doped suspension at 350-370 nm, 780-820 nm, and a shoulder at 420 nm, which are denoted as peak I, II, III bands respectively. Note that doped PANI will follow a similar curve to (c)

Both methods, in situ and emulsion polymerizations, yield NCC-PANI nanocomposite materials as evidenced by FT-IR spectroscopic analysis (FIG. 1) and the UV-vis spectra of FIG. 2. The characteristic broad band for O—H group of NCC appears at 3278 $cm^{-1}$ and the characteristic absorptions of polyaniline around 1553, 1483, 1290 and 800 $cm^{-1}$ are all present in the spectrum of the NCC-PANI nanocomposite material. The peaks around 1483 $cm^{-1}$ and 1553 $cm^{-1}$ result from stretching vibration of N-benzenoid-N and N=quinoid=N moieties in the PANI chains. The peak corresponding to out-of-bending vibration of the C—H bond of p-di-substituted benzene ring appears at around 800 $cm^{-1}$.

The electronic absorption bands of the polymer moiety observed in the UV-vis spectra of NCC-PANI nanocomposite suspensions indicate three bands for the doped suspension at 350-370 nm, 780-820 nm, and a shoulder at 420 nm, which are denoted as peak I, II, III, respectively. These absorptions are associated respectively with π-π* and excitonic transitions. The latter absorptions are related to charge carriers (polarons) responsible for promoting the electrical conductivity behaviour of polyaniline [14]. The peak shift to ~600 nm (higher transition energy) is in agreement with that obtained in the literature for the emeraldine base oxidation state [15, 16]. Since the as-synthesized NCC-PANI undergoes water dialysis during the purification stage of its preparation, PANI is not completely doped. Doping can be achieved by treatment with aqueous HCl (1M), promoting a further increase in the intensity of the shoulder at 420 nm and in the wavelength of the polaronic band to 830 nm—see FIG. 2. This is consistent with lower electronic transition energy and, consequently, a higher doping level.

Purified suspensions of NCC-PANI prepared using in situ or emulsion polymerization can be doped to the conductive form emeraldine salt by mixing with an aqueous acid solution. The preferred dopant used in this invention is HCl (1M). Films can be made by casting directly from the solution of PANI-NCC doped with HCl (1M); alternatively, the film or powder could be prepared by drying the purified PANI-NCC suspension, and then doped with HCl solution. FIG. 3 depicts SEM images of the surface of air-dried NCC-PANI nanocomposite films prepared via both polymerization techniques, whereby the homogeneous NCC scaffold is clearly shown. Time of doping is critical for the final conductivity value. Doping for 24 hours before drying is preferred. Conductivity of the obtained films or pellets is measured using the four probe technique at room temperature. Depending on the preparation conditions, electrical conductivities for the NCC-PANI nanocomposite materials prepared according to this disclosure range from $9.98 \times 10^{-5}$ to $1.88 \times 10^{-2}$ S·$cm^{-1}$ (refer to Table 1 for details). They could also have hardness ≥0.189 GPa, which is comparable to gold (see Table 2), or be formed into flexible films of tensile strength=9.74 MPa and stretch=0.54%, which is stronger than graphene paper (see Table 3 and FIG. 4). Furthermore, the NCC-PANI nanocomposite materials prepared according to this invention possess stable thermal properties—see FIG. 5. These unique electrical and mechanical properties render these materials suitable for use in a variety of value-added industrial products, such as batteries, electronics, electrical sensors, separation membranes, anti-static coatings for aerospace applications, as well as anti-corrosive coatings for automotives and other industrial applications.

There follows an outline of the mechanism of chemical polymerization of aniline:

The first step involves formation of the aniline radical cation. In the second step, coupling of N- and para-aminodiphenylamine (PADPA) occurs. It is then oxidized to the diradical dication. Although "head-to-tail" (i.e., N-para) coupling is predominant, some coupling in ortho-position also occurs, leading to defects in conjugation in the resultant polymer. In the subsequent chain propagation step, the initial polymer product is the fully oxidized pernigraniline salt form of polyaniline. When all oxidant is consumed, the remaining aniline in solution reduces the pernigraniline to form the final product, the green emeraldine salt (step 4). Colour changes during the reaction reflect the described steps: during the second step, the solution is pink due to PADPA; during the third step, the solution becomes blue due to formation of protonated pernigraniline; and, in the final step, the green emeraldine salt precipitates.

Step 1. Oxidation of Monomer

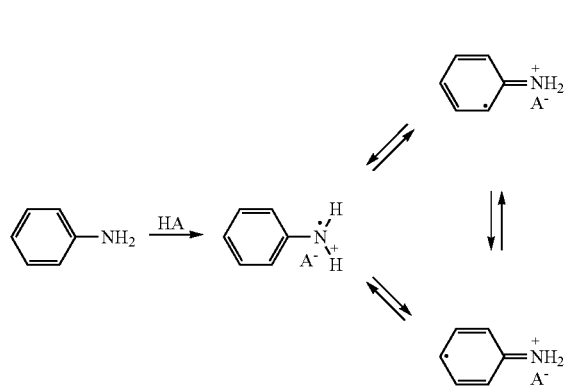

Step 2. Radical Coupling and Rearomatization

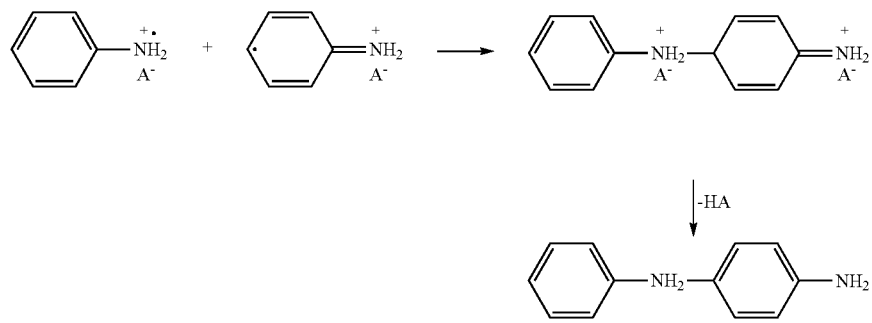

Step 3. Propagation of Chain

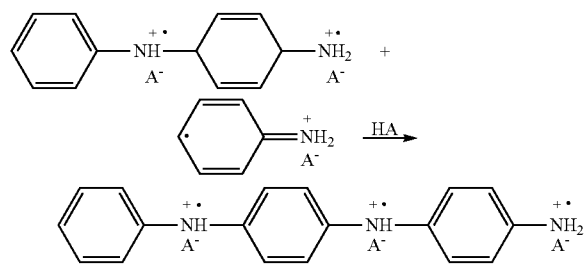

Step 4. Reduction of Pernigraniline Salt to Emeraldine Salt

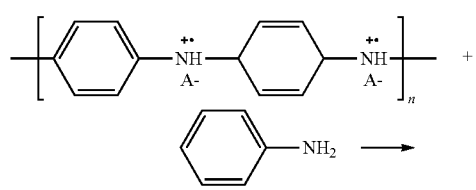

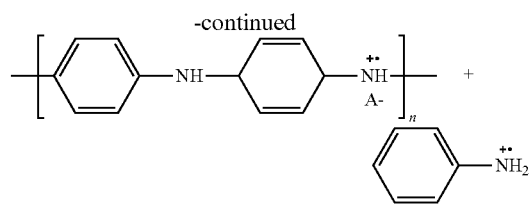

Preparation 1

In Situ Polymerization Using Hydrochloric Acid as Aqueous Medium

In a 500 ml Erlenmeyer flask, an equivalent of 1.14 ml aniline is dissolved in 110 ml of HCl (1M). 40 ml of NCC suspension (6 wt. %) sonicated for 10 minutes at 60% is then slowly added to the solution while mixing vigorously. After The NCC is activated for 1 hour, the suspension is cooled to 0-5° C. then a solution of 2.85 g of ammonium persulfate, dissolved in 100 ml of HCl (1M), is added dropwise to the NCC/anilinium/HCl slurry over a period of 30 minutes. The polymerization is allowed to proceed under vigorous stirring at ice temperature for 24 hours. The suspension is centrifuged in order to remove by-products and the remaining thick dark green suspension is washed twice with 200 ml of diluted solution of HCl (0.2M) then dialyzed against deionized water for 2 days. The purified PANI-NCC suspension is dispersed by mixing it for 15 minutes at 500 rpm using a mechanical stirrer followed by sonication at 60% power for 10 minutes. The purified nanocomposite suspension was stored at 4° C. The purification step can also be carried out by washing the thick dark green suspension obtained after the first centrifugation twice with 200 ml of acetone or methanol then vacuum dried at 50° C. overnight. In this case, a powdery PANI-NCC is obtained while using the first purification method films can be prepared. An aqueous solution of $H_2SO_4$ (1M) can also be used as polymerization medium instead of HCl (1M).

Preparation 2

In Situ Polymerization Using Water as Aqueous Medium in the Presence of HCSA as Dopant In a 500 ml Erlenmeyer flask, an equivalent of 40 ml of NCC suspension (6 wt. %) is mixed with 200 ml of deionized water and sonicated for 10 minutes at 60%. Then, an equivalent of 1.14 ml aniline is added to NCC suspension in water followed by 2.9 g of (1S)-(+)-10-camphoresulfonic acid (HCSA) while mixing vigorously at room temperature for 3 hours. Molar ratio of APS to CSA to Aniline is 1:1:1, their concentration in the solution is 0.05 M, and the mass ratio of NCC to aniline is 2:1. The dispersion is then cooled to 0-5° C. and a solution of 2.85 g of ammonium persulfate dissolved in 50 ml of deionized water is added dropwise to the NCC/anilinium/HCSA slurry over a period of 30 minutes. The polymerization is allowed to proceed under vigorous stirring at ice temperature for 24 hours. The suspension is centrifuged in order to remove by-products and the remaining thick dark green suspension is washed twice with 200 ml of deionized water then 2×200 ml of acetone or methanol and vacuum dried at 50° C. overnight. The thick dark green suspension can be purified after washing with water by dialyzing it against DI water for two days, then dispersing the dialyzed NCC-PANI suspension by mixing it for 15 minutes at 500 rpm using a mechanical stirrer followed by sonication at 60% power for 10 minutes. The purified nanocomposite suspension was stored at 4° C.

Preparation 3

Emulsion Polymerization Using the Ionic Surfactant DBSA as Emulsifier and Dopant In a 500 ml Erlenmeyer flask, an equivalent of 40 ml of NCC suspension (6 wt. %) is mixed with 200 ml of deionized water and sonicated for 10 minutes at 60%. Then, an equivalent of 1.14 ml aniline is added to NCC suspension in water followed by 3.85 g of dodecylbenzene sulfonic acid (DBSA) while mixing vigorously at room temperature for 3 hours. The suspension becomes white milky due to the formation of anilinium-DBSA complex in water. An APS/DBSA/aniline molar ratio of 1:1:1 is preferably used, their concentration in the solution is 0.05 M, and the mass ratio of NCC to aniline is fixed at 2:1. The dispersion is then cooled to 0-5° C. and a solution of 2.85 g of ammonium persulfate dissolved in 10 ml of deionized water is added drop wise to the NCC/anilinium/DBSA slurry over a period of 30 minutes. During this period the emulsion changes color from white to amber. The polymerization is allowed to proceed under vigorous stirring at ice temperature for 24 hours; a dark green colored NCC-PANI-DBSA suspension was obtained. The suspension is centrifuged in order to remove by-products and the remaining thick dark green suspension is washed with 2×200 ml of acetone:water (50:50) or methanol:water (50:50) and vacuum dried at 50° C. overnight or dialyzed against DI water (after the washings) for 2 days then sonicated at 60% for 10 minutes in order to obtain a stable suspension useful for making films of NCC-PANI. Aqueous solution of hydrochloric acid can also be used as solvent medium of this reaction instead of water.

Preparation 4

Emulsion Polymerization Using the Ionic Surfactant Sodium Lauryl Sulfate

In a 500 ml Erlenmeyer flask, an equivalent of 1.14 ml aniline is dissolved in 160 ml of HCl (1M). Then, an equivalent of 1.8 g of sodium lauryl sulfate is added to the anilinium solution while mixing vigorously. 40 ml of NCC suspension (6 wt. %), previously sonicated at 60% maximum power for 10 minutes, is slowly added to the solution. After the NCC is activated for 30 minutes, the temperature is increased to 80° C. and the mixture is left stirring for 90 minutes. The suspension is cooled to room temperature, and a solution of 2.85 g of ammonium persulfate, dissolved in 50 ml of HCl (1M), is added dropwise to the slurry over a period of 30 minutes. The polymerization is allowed to proceed under vigorous stirring at room temperature (~21° C.) for 24 hours. The suspension is centrifuged in order to remove by-products and the remaining thick dark green suspension is washed twice with 200 ml of diluted solution of HCl (0.2M) then dialyzed against deionized water for 2 days. The purified PANI-NCC suspension is dispersed by mixing it for 15 minutes at 500 rpm using a mechanical stirrer followed by sonication at 60% power for 10 minutes. Films can be made by casting directly from the as prepared solution of PANI-NCC or after doping the suspension with an aqueous solution of HCl (1M).

Preparation 5

Emulsion Polymerization Using a Nonionic Surfactant

In a 500 ml Erlenmeyer flask, an equivalent of 54 ml of NCC suspension (6 wt. %) is mixed with 176 ml of deionized water and sonicated for 10 minutes at 60%. Then, an equivalent of 560 µl of non-ionic surfactant (Igepal CO-630) is added to the NCC suspension in water followed by addition of 1.62 g of aniline hydrochloride while mixing vigorously at room temperature for 1 hour. APS/aniline molar ratio of 1:1 is preferably used, their concentration in the solution is 0.05 M, the mass ratio of NCC to aniline is fixed at 2:1, and a surfactant to monomer weight ratio fixed at 1/3. The dispersion is then cooled to 0-5° C. and a solution of 2.85 g of ammonium persulfate dissolved in 10 ml of deionized water is added dropwise to the mixture. The polymerization is allowed to proceed under vigorous stirring at ice temperature for 24 hours. The emulsion changes color after only 2 minutes of addition of oxidant from white to light green, light blue, then dark blue after 10 minutes and finally a dark green coloured NCC-PANI suspension is obtained. The suspension is centrifuged in order to remove by-products and the remaining thick dark green suspension is washed with 2×200 ml of diluted solution of HCl (0.2M) then dialyzed against deionized water for 2 days. The purified PANI-NCC suspension is dispersed by mixing it for 15 minutes at 500 rpm using a mechanical stirrer followed by sonication at 60% power for 10 minutes. The purified nanocomposite suspension was stored at 4° C. The purification step can also be carried out by washing the thick dark green suspension twice with 200 ml HCl (0.2M) followed by washing with acetone or methanol then vacuum dried at 50° C. overnight. In this case, a powdery PANI-NCC is obtained while using the first purification method films can be prepared.

Example 6

In-situ Polymerization in the Presence of Initiator (PPD)

In-situ polymerization of aniline with NCC can be performed in the presence of an aromatic additive or initiator such as N-phenyl-p-phenylenediamine (PPD) which is an aniline dimer. This initiator promotes the formation of nanofibrillar morphology of polyaniline during polymerization of aniline instead of the bulk granular one typical of Preparations 1-5 above.

37 mg (0.001 M) of N-phenyl-p-phenylenediamine (PPD) was dissolved in 5 ml of methanol, and the resulting solution added to a mixture of 0.73 ml (0.04 M) aniline dissolved in 63 ml of HCl (1M) and 32 ml of NCC suspension (4.7 wt. %) sonicated beforehand 10 minutes at 60%. The mixture was stirred for 30 minutes, then a solution of 0.46 g (0.01 M) of ammonium persulfate dissolved in 100 ml of HCl (1M) was rapidly mixed with the NCC/anilinium/PPD/HCl slurry. The polymerization was allowed to proceed under stirring at room temperature for 24 hours. The crude suspension was centrifuged and purified by dialysis against deionized water for 1 week. The purified PANI-NCC suspension was further dispersed by mixing it for 15 minutes at 500 rpm using a mechanical stirrer followed by sonication at 60% power for 10 minutes. The purified nanocomposite suspension was finally doped by mixing the suspension with a solution of HCl (1N) for 48 hours and air dried at ambient conditions.

Electrical conductivities of NCC-PANI nanocomposite films obtained with this method typically range between $6.53 \times 10^{-3}$ to $2.07 \times 10^{-1}$ S·cm$^{-1}$. The homogeneous NCC scaffold is also present in this case, as in previous preparations.

TABLE 1

Electrical conductivity of NCC-PANI nanocomposite materials prepared by in situ and emulsion polymerization compared to NCC, polyaniline and other materials.

| Material | ID | Polymerization Method | Preparation | Conductivity (S/cm) Undoped | Conductivity (S/cm) Doped with HCl 1M | Doping Time (hours) | Film Thickness |
|---|---|---|---|---|---|---|---|
| NCC-PANI nanocomposite materials according to this invention | A | In situ | 1 (using HCl) | $3.20 \times 10^{-5}$ | $1.16 \times 10^{-3}$ | 48 | $58.9 \pm 3.1$ μm |
| | B | | 1 (using H$_2$SO$_4$) | $6.56 \times 10^{-4}$ | $1.95 \times 10^{-3}$ | 2 | $13.4 \pm 0.1$ μm |
| | C | | 2 | $2.68 \times 10^{-4}$ | $6.70 \times 10^{-4}$ | 48 | $33.8 \pm 2$ μm |
| | D | Emulsion | 3 | $2.50 \times 10^{-3}$ | $1.88 \times 10^{-2}$ | 48 | $32.7 \pm 4.9$ μm |
| | E | | 3 (using HCl) | $2.87 \times 10^{-3}$ | $1.39 \times 10^{-2}$ | 24 | $39.3 \pm 8.8$ μm |
| | F | | 4 | $5.76 \times 10^{-7}$ | $9.98 \times 10^{-5}$ | 2 | $15.5 \pm 0.6$ μm |
| | G | | 5 | $7.38 \times 10^{-5}$ | $3.13 \times 10^{-4}$ | 24 | $33.8 \pm 1.2$ μm |
| PANI [a] | H | In situ | 1 | 1.39 | | — | $1.75 \pm 0.02$ mm |
| | I | | 2 | $4.01 \times 10^{-2}$ | | — | $1.06 \pm 0.02$ mm |
| | J | Emulsion | 3 | $1.36 \times 10^{-2}$ | | — | $1.56 \pm 0.02$ mm |
| NCC | — | — | — | $3.72 \times 10^{-10}$ | | — | $50.8 \pm 3.7$ μm |
| Germanium [17] | — | — | — | $2.2428 \times 10^{-2}$ | | — | — |
| Silicon [17] | — | — | — | $0.4325 \times 10^{-5}$ | | — | — |

[a] Measurements performed on compressed 2 cm (diameter) pellets under approximately 5-tonne pressure.

TABLE 2

Hardness data of NCC-PANI nanocomposite materials prepared by in situ and emulsion polymerization in relation to some other materials.

| Material | ID | Polymerization Method | Preparation | Vickers Hardness[a] (GPa) | Film Thickness |
|---|---|---|---|---|---|
| NCC-PANI nanocomposite materials | A | In situ | 1 (using HCl) | 0.210 | $58.9 \pm 3.1$ μm |
| | B | | 1 (using H$_2$SO$_4$) | 0.189 | $13.4 \pm 0.1$ μm |
| | C | | 2 | 0.213 | $33.8 \pm 2$ μm |
| | D | Emulsion | 3 | Soft + flexible[b] | |
| | E | | 3 (using HCl) | Soft + flexible[b] | |
| | F | | 4 | 0.208 | $15.5 \pm 0.6$ μm |
| | G | | 5 | 0.193 | $33.8 \pm 1.2$ μm |
| PANI[c] | H | In situ | 1 | Too low | $1.75 \pm 0.02$ mm |
| | I | | 2 | Too low | $1.06 \pm 0.02$ mm |
| | J | Emulsion | 3 | Too low | $1.56 \pm 0.02$ mm |
| NCC | — | — | — | 0.261 | $50.8 \pm 3.7$ μm |
| PANI-Polycarbonate composite [4] | — | Emulsion | — | 0.180 | — |
| Silver | — | — | — | 0.883 | — |
| Copper | | | | 1.223 | |
| Gold[d] [18] | | | | 0.257 | |
| Nickel[e] [18] | | | | 0.581 | |

[a] NCC-PANI nanocomposite films were doped with HCl 1M. All samples were subjected to 25 gf load for 15 seconds, and tested at FPInnovations unless otherwise noted.
[b] NCC-PANI nanocomposite films prepared via these procedures are soft, flexible and don't exhibit hardness-see Table 3.
[c] Measurements performed on compressed 2 cm wide pellets under a pressure of ~5 tonnes. PANI appears as flaky material and cannot form a free-standing film.
[d] Proof gold (≥99.99%), wrought annealed.
[e] Nickel 270, high purity grade of nickel make by powder metallurgy.

TABLE 3

Mechanical strength properties of NCC-PANI nanocomposite materials compared to other materials.

| Material | Tensile Strength (MPa) | Max. Strain (%) | Reference |
|---|---|---|---|
| NCC-PANI nanocomposite film | 9.74 ± 1.797 | 0.54 ± 0.114 | Sample D |
| Graphene-PANI composite paper | 12.6 | 0.11 | [19] |
| Graphene paper | 8.8 | 0.08 | |

REFERENCES

1. Skotheim, T. G., Elsenbaumer, R. L., Reynolds, J. R., "Handbook of Conducting Polymers," Marcel Dekker, New York, 2nd Ed. (1998).
2. Chandrasekhar, P., "Conducting Polymers, Fundamentals and Applications: A practical Approach," Kluer Academic, Boston (1999).
3. Wan, M., Li, M., Li, J., Liu, Z., "Transparent and conducting coatings of polyaniline composites," Thin Solid Films 259: 188-193 (1995).
4. Rao, P. S., Subrahmanya, S., Sathyanarayana, D. N., "Polyaniline-polycarbonate blends synthesized by two emulsion pathways," Synthetic metals 143: 323-330 (2004).
5. Lin, J., Tang, Q., Wu, J., Sun, H., "Synthesis, characterization and properties of polyaniline/expanded vermiculite intercalated nanocomposite," Sci. Technol. Adv. Mater. 9: 025010 (2008).
6. Mo, Z. L., Zhao, Z. L., Chen, H., Niu, G. P., Shi, H. F., "Heterogeneous preparation of cellulose-polyaniline conductive composites with cellulose activated by acids and its electrical properties," Carbohydrate Polymers 75: 660-664 (2009).
7. Lukasiewicz, M., Ptaszek, A., Koziel, L., Achremowicz, B., Grzesik, M., "Carboxymethylcellulose/polyaniline blends. Synthesis and properties," Polymer Bulletin 58: 281-288 (2007).
8. Mattoso, L. H. C., Medeiros, E. S., Baker, D. A., Avloni, J., Wood, D. F., Orts, W., "Electrically conductive nanocomposites made from cellulose nanofibrils and polyaniline," Journal of Nanoscience and nanotechnology 9: 2917-2922 (2009).
9. Berg, V. D. O, Schroeter, M., Capadona, J. R., Weder C., "Nanocomposites based on cellulose whiskers and (semi) conducting conjugated polymers," Journal of. Material Chemistry 17: 2746-2753 (2007).
10. Chiang, J. C., Macdiamid, A. G., "Polyaniline: Protonic acid doping of the emeraldine form to the metallic regime" Synth. Met. 13: 193-205 (1986).
11. Cao, Y. Smith, P., Heeger, A., "Processible forms of electrically conductive polyaniline," U.S. Pat. No. 5,232,631 (1993).
12. Kinlen, P. J., "Emulsion-polymerization process and electrically-conductive polyaniline salts," U.S. Pat. No. 5,567,356 (1996).
13. Österholm, J. E., Cao, Y., Klavetter, F., Smith, P., "Emulsion polymerization of aniline," Polymer 35: 2902-2906 (1994).
14. Stafström, S., Brédas, J. L., Epstein, A. Aj., Woo, H. S., Tanner, D. B., Huang, W. S., MacDiamid, A. G., "Polaron Lattice in Highly Conducting Polyaniline: Theoretical and Optical Studies," Phys. Rev. Lett. 59: 1464-1467 (1987).
15. Kane-Maguire, L. A. P., MacDiamid, A. G., Norris, I. D., Wallace, G. G., Zheng, W. "Facile preparation of optically active polyaniline via the in situ chemical oxidative polymerization of aniline," Synth. Met., 106: 171-176 (1999).
16. Epstein, A. J., Ginder, J. M., Zuo, F., Bigelow, R. W., Woo, H. S., Tanner, D. B., Richter, A. F., Huang, W. S., MacDiamid, A. G., "Insulator-to-metal transition in polyaniline," Synth. Met. 18: 303-309 (1987).
17. Kakani, S. L., "Semiconductors and junction diodes," Electronics Theory and Applications, pp. 23-24 (2005).
18. Metals Handbook, Vol. 2, 10$^{th}$ ed., Properties and Selection: Nonferrous Alloys and Special-Purpose Materials, pp. 704-707, ISBN 0-87170-378-5 (1990).
19. Wang, D. W, Li, F., Zhao, J., Ren, W., Chen, Z. G., Tan, J., Wu, Z. S., Gentle, I., Lu, G. Q., Cheng, H. M., "Fabrication of graphene/polyaniline composite paper via in situ anodic electropolymerization for high-performance flexible electrode," ACS Nano 3: 1745-1752 (2009).

The invention claimed is:

1. A nanocomposite of polyaniline and nanocrystalline cellulose (NCC) wherein said nanocrystalline cellulose (NCC) forms a scaffold of the composite and said polyaniline occupies voids of said scaffold, wherein said scaffold is defined by a naturally formed ordered arrangement in a helical assembly of a chiral nematic liquid crystal phase of NCC, and wherein said nanocrystalline cellulose (NCC) comprises crystallites having a cross-section dimension of 5-14 nm and a length of 20-100 nm.

2. A nanocomposite according to claim 1, wherein said polyaniline is granular.

3. A nanocomposite according to claim 1, wherein said polyaniline is fibrillar.

4. A nanocomposite according to claim 1, wherein said polyaniline in said composite is formed by polymerization of aniline in the presence of said nanocrystalline cellulose (NCC).

5. A nanocomposite according to claim 4, wherein said polymerization is in situ polymerization.

6. A nanocomposite according to claim 4, wherein said polymerization is emulsion polymerization.

7. A nanocomposite according to claim 1, having an electrical conductivity in a range from $9.98 \times 10^{-5}$ to $1.88 \times 10^{-2}$ S·cm$^{-1}$.

8. A process for producing a nanocomposite of polyaniline and nanocrystalline cellulose (NCC) comprising polymerizing aniline in the presence of nanocrystalline cellulose (NCC), wherein said NCC forms a scaffold of the composite and the aniline polymerizes in the voids of the scaffold, wherein said scaffold is defined by a naturally formed ordered arrangement in a helical assembly of a chiral nematic liquid crystal phase of NCC, and wherein said nanocrystalline cellulose (NCC) comprises crystallites having a cross-section dimension of 5-14 nm and a length of 20-100 nm.

9. A process according to claim 8, wherein said polymerization is in situ polymerization.

10. A process according to claim 8, wherein said polymerization is emulsion polymerization.

11. A process according to claim 8, wherein said polymerization is carried out in the presence of a protonic acid.

12. A process according to claim 8, wherein said polymerization is carried out in the presence of an oxidant.

13. A process according to claim 8, wherein said polymerization is carried out at a mass ratio of NCC to aniline of 2:1.

14. A process according to claim 8, wherein said polymerization is carried out in the presence of a protonic acid and an oxidant in an aqueous vehicle at a mass ratio of NCC to aniline of 2:1 and a mole ratio of aniline to oxidant of 1:1.

15. A nanocomposite according to claim 1, having an electrical conductivity in a range from $9.98 \times 10^{-5}$ to $1.88 \times 10^{-2}$ S·cm$^{-1}$.

16. A nanocomposite according to claim 6, having an electrical conductivity in a range from $9.98 \times 10^{-5}$ to $1.88 \times 10^{-2}$ S·cm$^{-1}$.

\* \* \* \* \*